(12) United States Patent
Hikmet

(10) Patent No.: US 6,576,027 B2
(45) Date of Patent: Jun. 10, 2003

(54) METHOD OF MANUFACTURING A LITHIUM BATTERY

(75) Inventor: Rifat Ata Mustafa Hikmet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/798,545

(22) Filed: Mar. 2, 2001

(65) Prior Publication Data

US 2002/0053131 A1 May 9, 2002

(30) Foreign Application Priority Data

Mar. 6, 2000 (EP) .............................. 00200788

(51) Int. Cl.⁷ .......................... H01M 10/04; H01M 2/18
(52) U.S. Cl. ...................... 29/623.1; 29/623.4; 429/130
(58) Field of Search ............................ 29/623.1, 623.3, 29/623.4; 429/130, 241

(56) References Cited

U.S. PATENT DOCUMENTS 5,019,468 A  *  5/1991  Miyabayashi ............... 429/241
5,527,638 A  *  6/1996  Kinoshita et al. ......... 429/241 X
6,280,877 B1  *  8/2001  Urry et al. ............. 29/623.1 X

FOREIGN PATENT DOCUMENTS

WO    WO0004601    7/1999    .......... H01M/10/12

OTHER PUBLICATIONS

Hosokawa Takehiro, "Patent Abstracts of Japan", vol. 1999, No. 08, Jun. 1999.

* cited by examiner

Primary Examiner—Stephen Kalafut
(74) Attorney, Agent, or Firm—Dicran Halajian

(57) ABSTRACT

Disclosed is a method of manufacturing a lithium battery having a stack of a negative electrode, a separator, and a positive electrode. A pattern of holes is produced in the negative electrode as well as in the positive electrode. Subsequently, a polymeric material is applied on the stack, so that the polymeric material penetrates the holes by which the negative electrode, the positive electrode and the separator are coupled and pressed together. By subjecting the polymeric material to a treatment with high-energy radiation the thermal and mechanical properties of the polymer are improved.

20 Claims, 1 Drawing Sheet

METHOD OF MANUFACTURING A LITHIUM BATTERY

FIELD OF THE INVENTION

The invention relates to a method of manufacturing a lithium battery comprising a stack of a negative electrode, a separator, and a positive electrode, which method comprises applying negative electrode material onto a negative current collector so as to form the negative electrode, applying positive electrode material onto a positive current collector so as to form the positive electrode, and arranging a separator between the negative electrode and the positive electrode, wherein the method comprises the following steps:

a) producing a pattern of holes in the negative electrode;
b) producing a pattern of holes in the positive electrode;
applying a polymeric material on the stack, so that the polymeric material penetrates the holes by which the negative electrode, the positive electrode and the separator are stuck and pressed together.

BACKGROUND OF THE INVENTION

Due to a growing market for lightweight, portable cordless consumer products, such as CD-players, mobile telephones, laptop computers and video cameras, there is an increased need for high-density batteries. Specifically, very thin and flexible batteries are required. In order to provide for an acceptable portability, the batteries contained in said consumer products should provide the necessary amount of energy at the smallest possible weight and volume. Lithium is a very advantageous material for use in batteries in which a high energy density at a minimum weight is required. However, the thinner the battery gets, the more difficult the application of pressure, which is needed to maintain sufficient contact between the respective components of the battery, becomes.

A method of manufacturing a lithium battery according to the preamble is known from the International patent application with publication number WO 00/04601.

The battery which is obtained by said method has thin and flexible form and provides at the same time a very high energy density. Moreover, the contact between the electrodes and the separator is obtained and maintained in a very efficient way. The battery can be packed in a thin walled can, as the wall of such can is not needed to maintain sufficient pressure on the respective components of the battery. In one of the methods according to the International application WO 00/04601, a film of a polymeric material is applied onto both sides of the stack, and said polymeric film is subjected to heat and pressure. As a result thereof the polymeric material melts and penetrates into the holes. By said method a battery is obtained with a polymeric film at both sides of the stack as well as polymeric material in each of the holes acting as a plug or rivet and sticking to the respective layers, causing these layers to be bonded together.

Generally, a low temperature processable polymer is used in order to preserve the thermal fuse function of the separator. Such polymer often does not have sufficient mechanical properties at higher temperatures.

SUMMARY OF THE INVENTION

It is an object of the invention to provide a method of manufacturing a lithium battery according to the preamble, by which a battery is obtained with improved thermal and mechanical properties of the polymer.

To this end the method of manufacturing a lithium battery according to the preamble is characterized in that after step c) the polymeric material is subjected to a treatment with high energy radiation.

By treating the polymeric material with high-energy radiation the polymeric material is caused to cross-link which enhances its mechanical properties at higher temperatures.

In a particular embodiment the high-energy radiation comprises electron beam radiation. In another preferred embodiment, the radiation is performed by means of gamma-rays.

BRIEF DESCRIPTION OF THE DRAWINGS

Embodiments of the present invention will now be described, by way of example, with reference to the accompanying drawings, wherein.

DETAILED DESCRIPTION OF THE INVENTION

Figure 1:
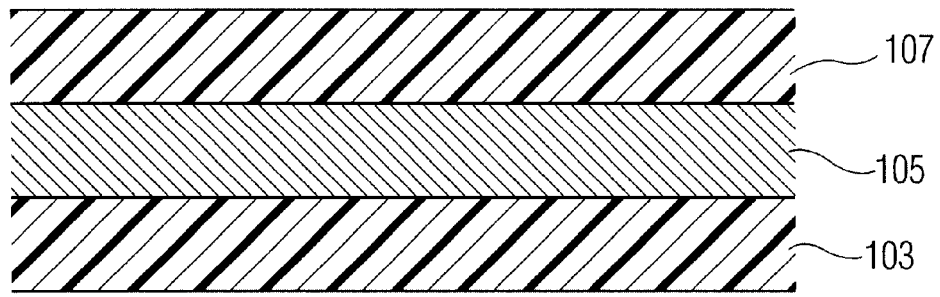
FIG. 1 shows a cross sectional view of a battery according to the present invention.

When polyolefines are subjected to high radiation, charged and excited species are formed, which leads to the formation of free radicals, as shown below.

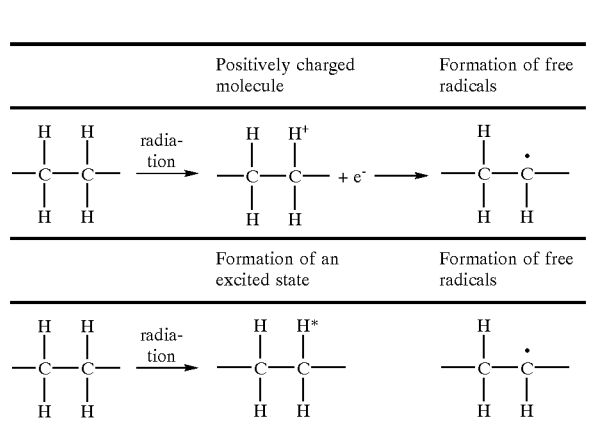

Subsequently, said radicals can react, which results in the formation of cross links as shown below.

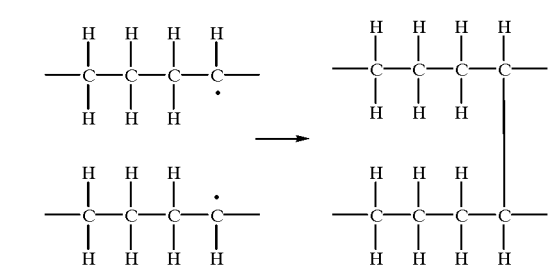

Said cross-linked polyolefins show an improved mechanical strength at higher temperatures.

In order to promote cross-linking it is preferred to perform cross-linking in an oxygen free atmosphere. Irradiation under nitrogen atmosphere or vacuum are two favourable possibilities.

After irradiation it is advantageous to heat up the samples above their melting temperature in order to cause all the remaining radicals to react so that no degradation of the sample can occur when it is brought in contact with oxygen Preferably, the energy of the radiation which is used for cross linking is in the range of 10–100 keV. The dose which is needed in order to cross link a sample is in the order of several Mrad's. (1 Mrad=10 Jouls/g).

In the above mentioned methods, use is preferably made of porous polymeric material for the polymeric material which has to penetrate into the holes in the electrodes, e.g. porous polyethylene. Preferably, the polymeric material is elastic.

The electrode materials can be made by mixing negative or positive active material, conductive material, and binder material, which are all in the form of powder, in a dry process, or in a wet process in which water or an organic solvent is further added.

The paste-like mixture obtained is then coated onto the current collector, dried and compressed. For this purpose, one of the following coating methods can be generally employed: screen printing, roller coating, doctor blade coating, knife coating, extrusion coating, bar coating, dip coating and squeeze coating. The thickness of the coated layer, which is compressed after drying, generally is in the range of 1 to 1000 $\mu$m.

Pressing of the stack in the above mentioned methods is accomplished by simply pressing it for a short period of time between heated metal plates at a pressure of about $5.10^4$ at about 110 to 150° C. The operation may also be carried out using calender rollers. After heating, the stack is cooled down to room temperature. Heating and cooling down may also be carried out in a mould with a particular shape, e.g. the shape of the appliance into which the battery should be fitted.

In the same way as described above, a multilayer stack of layers can be bonded together in one step, thereby obtaining a battery of increased capacity or voltage.

The lithium battery of the invention can be used in various (cordless) applications, for example, notebook personal computers, portable CD-players, portable telephones, paging equipment, video cameras, electric shavers, electric tools, electric vehicles and hearing aids. The lithium battery may be used as a primary or as a secondary battery.

The invention will be elucidated in greater detail by means of an exemplary embodiment.

EXEMPLARY EMBODIMENT

FIG. 1 is a cross sectional view of one embodiment of a storage battery according to the invention. In this embodiment, a storage battery 100 includes a negative electrode layer 103, a separator layer 105, and a positive electrode layer 107 which are stacked in this order. In order to improve the thermal and mechanical properties of the polymeric material, said material is subjected to a treatment with high energy irradiation.

A mixture for the negative electrode material 10, shown in FIG. 1, is prepared by mixing 6 g graphite particles having a particle size of 10 $\mu$m as the active positive material, 4.5 g carboxymethyl cellulose (1% aqueous solution) and 0.5 g styrene butadiene rubber (60% dispersion in water) as a binder, and formed into a paste to be applied as a coating onto both surfaces of a copper foil current collector 20. The thickness of the coating 10 is 200 $\mu$m. The thickness of the copper foil 20 amounts to 14 $\mu$m. The pasted current collector is pre-dried at 85° C. for 15 minutes, heat-treated at 110° C. for 3 hours and then pressed until the thickness becomes 10 $\mu$m to form the negative electrode 30. The negative electrode 30 is cut out so as to be square of 2×2 cm².

A mixture for a positive electrode material 40 is prepared by mixing 6 g $LiCoO_2$ as the active positive material, 0.18 g acetylene black as a conductive material, 5 g carboxymmethl cellulose (1% aqueous solution) and 0.7 g polytetrafluoroethylene (60% dispersion in water) as a binder, and formed into a paste to be applied as a coating onto both surfaces of an aluminum foil current collector 50. The thickness of the coating 40 is 420 $\mu$m. The thickness of the aluminum foil 50 amounts to 20 $\mu$m. The pasted current collector is pre-dried at 85° C. for 15 minutes, heat-treated at 250° C. for 4 hours and then pressed until the thickness becomes 100 $\mu$m to form the positive electrode 60. The positive electrode 60 is cut out so as to be a square 2×2 cm².

A 25 $\mu$m thick porous plyethylene foil is used as a separator 70.

Figure 2:
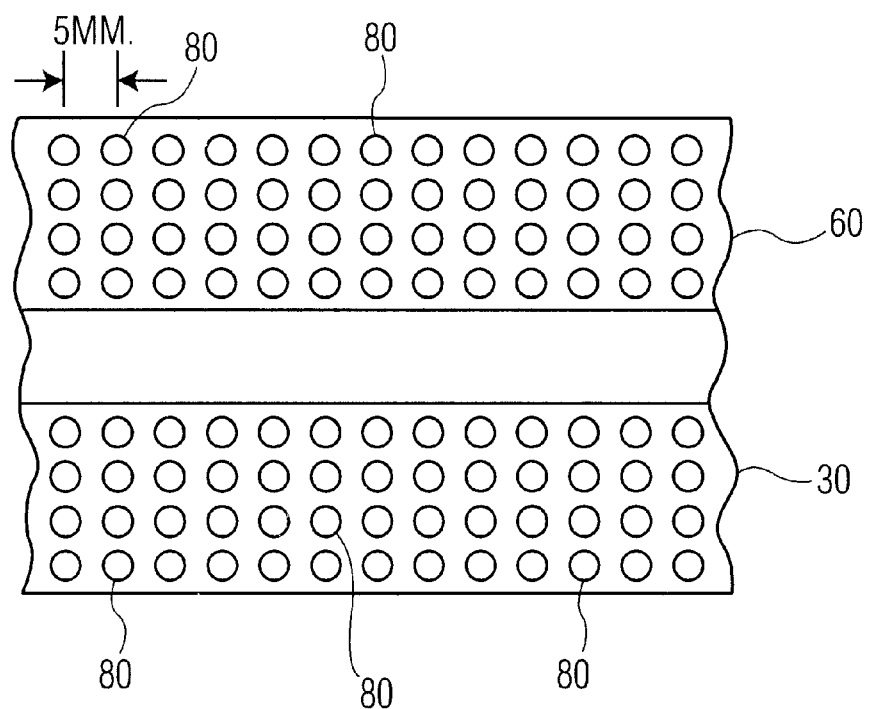
FIG. 2 show a plan view of a battery according to the present invention.

FIG. 2 is a plan view showing the negative electrode 30 and positive electrode 60 each provided with a pattern of holes 80 by mechanical punching. The diameter of the holes 80 is generally about 1 mm. The holes 80 are provided in a two-dimensional array with a mutual hole distance of 5 mm.

In order to manufacture a lithium battery according to the invention, a stack is formed of the negative electrode, the separator and the positive electrode. Subsequently, a polymeric material is applied to the stack. Said polymeric material is caused to melt—generally by subjecting it to heat and pressure—, thereby penetrating into the holes by which the negative electrode, the positive electrode, and the separator are stuck and pressed together. The polymeric material can be applied in different ways. In one embodiment a polymeric film is applied at both sides of the stack. Another possibility is to inject the polymeric material by means of injection molding. In still another embodiment, the separator is made of polymeric material; said material will at least partially melt when the stack is subjected to heat and pressure, thereby penetrating into the holes in the electrodes. Of course, also other ways of applying the polymeric material are within the scope of the invention.

In order to improve the thermal and mechanical properties of the polymeric material, said material is subjected to a treatment with high energy irradiation. In this example the polymeric material is subjected to electron beam irradiation with a radiation energy of 50 keV in a dose of 5 Mrad. In order to promote the cross-linking which is caused by the irradiation treatment, the latter treatment is preferably carried out in a substantially oxygen free atmosphere. After irradiation the sample is heated up to a temperature above the melting temperature of the polymeric material. By such heating treatment, the remaining radicals are caused to react, and degradation of the radicals is prevented, when the sample is brought in contact with oxygen.

After the treatment with high-energy radiation the stack can be filled with an electrolyte.

What is claimed is:

1. A method of manufacturing a lithium battery comprising a stack of a negative electrode, a separator, and a positive electrode, which method comprises applying negative electrode material onto a negative current collector so as to form the negative electrode, applying positive electrode material onto a positive current collector so as to form the positive electrode, and arranging a separator between the negative electrode and the positive electrode, wherein the method comprises the following steps:

a) producing a pattern of boles in the negative electrode;

b) producing a pattern of holes in the positive electrode;

c) applying a polymeric material on the stack, so that the polymeric material penetrates the holes by which the negative electrode, the positive electrode and the separator are coupled and pressed together, and d) subjecting the polymeric material to a treatment with radiation.

2. A method of manufacturing a lithium battery according to claim 1, wherein in that the high-energy radiation comprises electron beam radiation.

3. A method of manufacturing a lithium battery according to claim 1, wherein the high-energy radiation comprises gamma ray radiation.

4. A method of manufacturing a lithium battery according to claim 1, wherein the treatment with high-energy radiation is performed in a substantially oxygen free atmosphere.

5. A method of manufacturing a lithium battery according to claim 1, wherein after the treatment with high-energy radiation, at least the polymeric material is heated above its melting temperature.

6. A method of manufacturing a lithium battery according to claim 1, wherein the energy of the radiation which is used for cross linking is in the range of 10–100 keV.

7. A method of manufacturing a lithium battery comprising:

forming a negative electrode having a first plurality of holes;

forming a positive electrode having a second plurality of holes;

forming a separator between said negative electrode and said positive electrode to form a stack;

applying a binding material over said stack; said binding material penetrating said first plurality of holes and said second plurality of holes to hold together said negative electrode, said positive electrode, and said separator; and treating said binding material with radiation.

8. The method of claim 7, wherein said negative electrode is formed by forming a negative material over a negative current collector.

9. The method of claim 7, wherein said positive electrode is formed by forming a negative material over a positive current collector.

10. The method of claim 7, wherein said radiation comprises electron beam radiation.

11. The method of claim 7, wherein said radiation comprises gamma ray radiation.

12. The method of claim 7, wherein said treating with radiation is performed in a substantially oxygen free atmosphere.

13. The method of claim 7, further comprising heating said binding material above its melting point.

14. The method of claim 7, further comprising heating said binding material above its melting point.

15. A method of manufacturing a lithium battery comprising:

forming a negative electrode having a first plurality of holes;

forming a positive electrode having a second plurality of holes;

forming a separator including binding material between said negative electrode and said positive electrode to form a stack;

heating said stack so that said binding material penetrates said first plurality of holes and said second plurality of holes to hold together said negative electrode, said positive electrode, and said separator; and treating said binding material with radiation.

16. The method of claim 15, wherein said negative electrode is formed by forming a negative material over a negative current collector.

17. The method of claim 15, wherein said positive electrode is formed by forming a negative material over a positive current collector.

18. The method of claim 15, wherein said radiation comprises one of electron beam radiation and gamma ray radiation.

19. The method of claim 15, wherein said treating with radiation is performed in substantially oxygen free atmosphere.

20. The method of claim 15, wherein energy of said radiation is approximately 10–100 keV.

* * * * *